US012730505B2

(12) United States Patent
Hudman

(10) Patent No.: US 12,730,505 B2
(45) Date of Patent: Sep. 8, 2026

(54) GRAPHICAL USER INTERFACE-BASED EYE TRACKING CALIBRATION

(71) Applicant: Valve Corporation, Bellevue, WA (US)

(72) Inventor: Joshua Mark Hudman, Issaquah, WA (US)

(73) Assignee: Valve Corporation, Bellevue, WA (US)

(*) Notice: Subject to any disclaimer, the term of this patent is extended or adjusted under 35 U.S.C. 154(b) by 315 days.

(21) Appl. No.: 18/305,503

(22) Filed: Apr. 24, 2023

(65) Prior Publication Data

US 2024/0353921 A1 Oct. 24, 2024

(51) Int. Cl.

*G06F 3/01* (2006.01)
*A63F 13/537* (2014.01)
*G06F 3/0346* (2013.01)

(52) U.S. Cl.

CPC ............ *G06F 3/013* (2013.01); *A63F 13/537* (2014.09); *G06F 3/0346* (2013.01)

(58) Field of Classification Search

None
See application file for complete search history.

(56) References Cited

U.S. PATENT DOCUMENTS 10,379,612 B1 * 8/2019 Bonnier ................ G06F 3/0304
10,503,247 B2 * 12/2019 Samples ................ G06F 3/017
11,073,906 B1 * 7/2021 Hudman .............. G06N 3/0442
11,106,280 B1 * 8/2021 Bigham ................. G06V 40/67
11,442,541 B1 * 9/2022 Dong ...................... G06F 3/013
2013/0033524 A1 * 2/2013 Wang .................... G06F 3/0485 345/156
2014/0055591 A1 * 2/2014 Katz ....................... G06F 21/32 348/78

(Continued)

FOREIGN PATENT DOCUMENTS

JP 2005245598 A * 9/2005
WO WO-2023037692 A1 * 3/2023 ............ A61B 3/113

OTHER PUBLICATIONS

Espacenet, WO2021153577A1 English Translation, 2025, https://translationportal.epo.org/emtp/translate/?ACTION=description-retrieval&COUNTRY=WO&ENGINE=google&FORMAT=docdb&KIND=A1&LOCALE=en_EP&NUMBER=2021153577&OPS=ops.epo.org/3.2&SRCLANG=ja&TRGLANG=en , pp. 1-86 (Year: 2025).*

(Continued)

*Primary Examiner* — Tramar Harper
(74) *Attorney, Agent, or Firm* — Lee & Hayes, P.C.

(57) ABSTRACT

Calibrating an eye tracking system based at least in part on a user interface element(s) presented on a display panel(s) of a head-mounted display (THMID) is disclosed. A processor(s) may present a user interface element on a display panel(s) of a HMD, and may receive, from a handheld controller, user input data indicating that a user wearing the H/ID has provided user input associated with the user interface element via the handheld controller. In response to the receiving of the user input data from the handheld controller, the processor(s) may receive, from an eye tracking sensor(s) of the HMD, eye data associated with one or more eyes of the user, and may calibrate the eye tracking system based at least in part on the eye data and location data indicating a location on the display panel(s) where the user interface element is presented.

20 Claims, 6 Drawing Sheets

(56) References Cited

U.S. PATENT DOCUMENTS

| | | | | |
|---|---|---|---|---|
| 2015/0049013 | A1* | 2/2015 | Rahman | G06F 1/163 345/156 |
| 2015/0169096 | A1* | 6/2015 | Nishizawa | G06F 3/017 345/173 |
| 2015/0316981 | A1* | 11/2015 | Sellen | G06V 40/193 345/156 |
| 2015/0331485 | A1* | 11/2015 | Wilairat | G02B 27/0093 345/156 |
| 2016/0139665 | A1* | 5/2016 | Lopez | G06F 3/013 345/156 |
| 2019/0354172 | A1* | 11/2019 | Davies | G06F 3/013 |
| 2020/0275087 | A1* | 8/2020 | Yasuda | H04N 13/344 |
| 2022/0121344 | A1 | 4/2022 | Pastrana Vicente et al. | |
| 2023/0068862 | A1 | 3/2023 | Hayashi et al. | |
| 2023/0393655 | A1* | 12/2023 | Mizuo | G02B 27/0093 |
| 2024/0286026 | A1* | 8/2024 | Cheung | A63F 13/213 |

OTHER PUBLICATIONS

Search Report and Written Opinion for International Application No. PCT/US24/22667, Dated Jul. 12, 2024, 13 pages.

* cited by examiner

GRAPHICAL USER INTERFACE-BASED EYE TRACKING CALIBRATION

BACKGROUND

Head-mounted displays (HMDs) are used in various fields including engineering, medical, military, and video gaming. HMDs present graphical information or images to a user as part of a virtual reality (VR), augmented reality (AR), and/or a mixed reality (MR) environment. As an example, while playing a VR video game, a user may wear a HMD to be immersed within a virtual environment. Some HMDs utilize an eye tracking system to track where the user is looking in real-time, which can enable a variety of applications and enhancements.

Provided herein are technical solutions to improve and enhance these and other systems.

DETAILED DESCRIPTION

Figure 1:
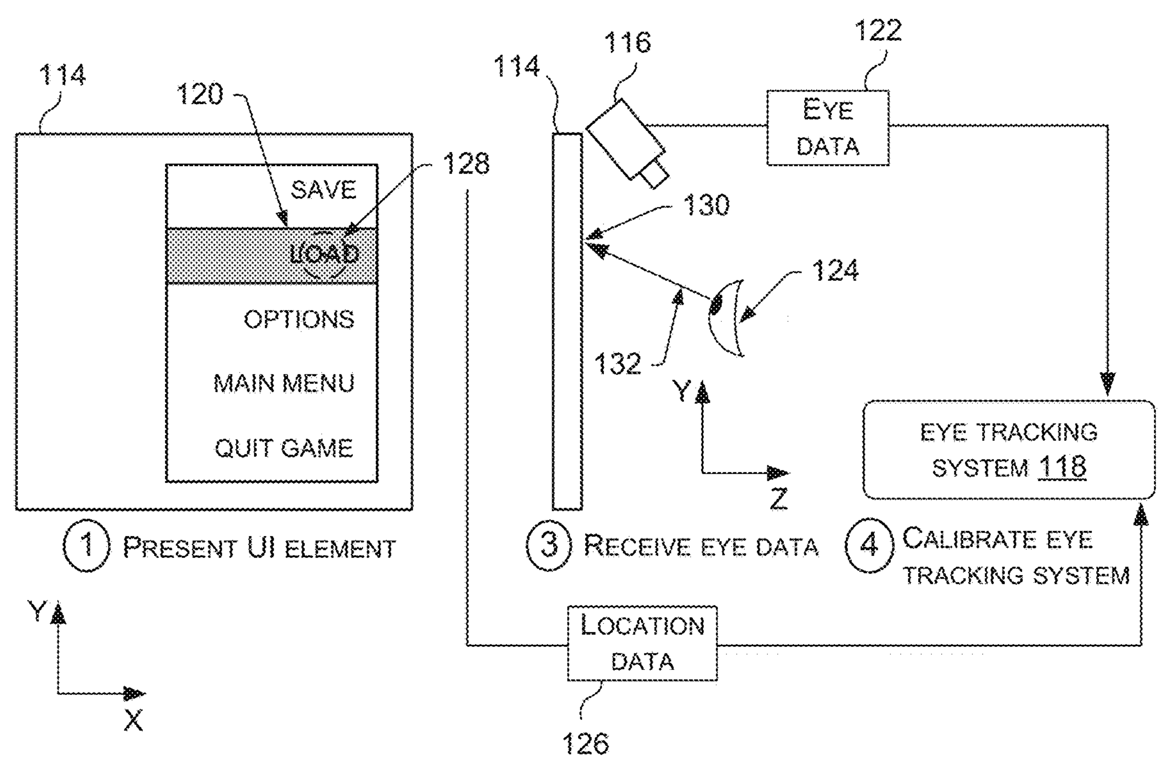
FIG. 1 illustrates an example graphical user interface (GUI)-based technique for calibrating an eye tracking system, in accordance with embodiments disclosed herein.
Figure 1:
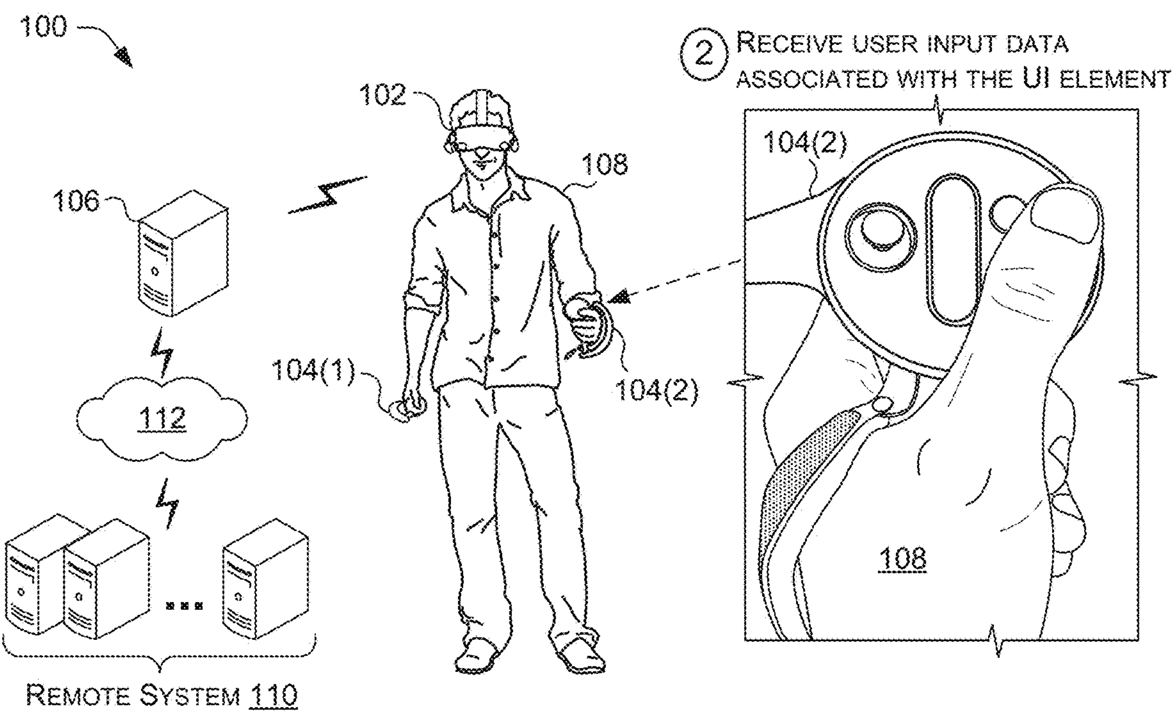

Due to the natural variation in eye attributes from user-to-user, systems that utilize eye tracking typically calibrate the eye tracking system before it is used. This helps ensure that eye tracking works accurately for a particular user. A common calibration procedure involves presenting calibration targets at various location via a HMD, and asking a user who is wearing the HMD to fixate (e.g., focus their gaze) on each calibration target for a few seconds while data is collected. This conventional calibration procedure requires willful engagement of the user who must actively cooperate in the calibration process for the calibration to be successful. The eye tracking calibration is also typically performed once, before the eye tracking system is used (i.e., the eye tracking system is not calibrated again at any point during a user's session). Accordingly, this conventional eye tracking calibration approach requires the attention of the user as an active participant who is heavily involved in the calibration procedure. Users may find this to be a poor user experience, especially if the calibration fails on the first attempt and the user is forced to step through the entire calibration procedure again in an attempt to properly calibrate the eye tracking system. Moreover, despite the benefits of using eye tracking, it can be challenging to ensure that the accuracy of the eye tracking system is stable throughout a session. That is, an eye tracking system that is calibrated at the beginning of a session may nevertheless become inaccurate at some point during the session. For example, if the HMD changes position relative to the user's head, the accuracy of the eye tracking system can degrade. This movement of the HMID on the user's head is sometimes referred to as "slip" in eye tracking. An eye tracking system that is sensitive to slip is unable to distinguish an instance where the user's eyes have moved (e.g., when the user looks in a different direction) from an instance where the user's eyes remain fixed but the eye tracking sensor(s) has/have moved relative to the user's eyes due to slippage. Because slippage can occur repeatedly during use of a HMD (e.g., during gameplay), especially as the user perspires and/or if the HMD is not snuggly fitted to the user's head, the eye tracking system may, over time, start to determine gaze points that are incorrect (i.e., the user is not actually looking where the eye tracking system thinks the user is looking). Accordingly, even though the eye tracking system may be properly calibrated at the beginning of a session, the eye tracking accuracy may degrade over time and become inaccurate towards the end of the session.

Described herein are, among other things, techniques, devices, and systems for calibrating an eye tracking system based at least in part on a user interface element(s) presented on a display panel(s) of a HMD, and for continuously calibrating the eye tracking system during use of the eye tracking system. The HMD described herein can take many forms, including a helmet, a visor, goggles, a mask, glasses, or any other suitable type of head and/or eyewear worn on the head of a user. The HMD may include one or more display panels that display images (e.g., frames) for viewing by the user wearing the HMD. In some examples, the images are rendered by an application, which may be executing onboard the HMD and/or on a separate computing device (e.g., a personal computer, video game console, etc.) that is communicatively coupled (wired or wirelessly) to the HMD. Additionally, in some examples, the user may operate one or more handheld controllers in conjunction with the HMD to further engage in a VR, AR, and/or MR environment.

A system including the HMD may include and/or utilize an eye tracking system configured to generate eye tracking data for tracking the eyes of a user wearing the HMD. In other words, the eye tracking data generated by the eye tracking system may indicate where the user is looking in real-time. Eye tracking can enable a variety of applications and enhancements for the user wearing the HMD. For example, eye tracking can be used for foveated transport of pixel data to a wireless HMD. In this example use case, the amount of pixel data associated with areas of an image where the user is not, or will not be, looking can be reduced in order to conserve wireless transmission bandwidth, which is inherently limited. This, in turn, allows for playing graphics-intensive video games on a wireless HMD with high fidelity (at least as perceived by the user). Other example use cases for eye tracking include, without limitation, aim-assist in first-person shooter video games, expressive avatars, implicit actions such as eye-gaze-based auto scrolling, eye-supported zoom and pan, or the like.

The eye tracking system described herein may include one or more eye tracking sensors that are disposed inside the HMD. In some examples, the eye tracking sensor(s) is/are a camera(s) or another type of optical sensor(s) aimed at the eye(s) of the user wearing the HMD. In these examples, the eye tracking system may implement a video oculography (VOG)-based eye tracking algorithm. In some examples, eye data (e.g., image data representing images of the eye(s)) is generated by the eye tracking sensor(s). The eye tracking system can analyze this eye data to generate the eye tracking data indicative of where the user is looking. In some examples, the eye tracking data indicates a gaze point, a gaze angle, a gaze vector, or the like.

As described herein, the eye tracking system can be continuously calibrated during use of the eye tracking system based at least in part on a user interface element(s) presented on a display panel(s) of a HMD. That is, throughout a session involving a user wearing and using the HMD, user interface elements may be presented at various times and at various locations on the display panel(s) of the HMD, and these user interface elements are utilized to calibrate the eye tracking system. The user interface elements may include, without limitation, buttons, windows, text, icons, symbols, graphics, or the like, which are normally presented during a session (e.g., during gameplay). In this sense, the user interface elements are not indicated to the user as being calibration targets, nor is the user hassled with participating in an eye tracking calibration procedure before their session starts. Instead, the calibration of the eye tracking system is a seamless experience where the user does not have to think about the ongoing calibration of the eye tracking system. In some examples, the user might not even know that the eye tracking system is being calibrated "behind the scenes." In other words, unless the user is aware of how the eye tracking system is calibrated, the calibration of the eye tracking system is not otherwise made transparent to the user of the HMD; the eye tracking calibration occurs during normal use of the HMD.

The eye tracking system may be calibrated at times when it is likely that the user is looking at the user interface elements mentioned above. In some examples, the eye tracking system is calibrated in response to receiving, from a handheld controller, user input data indicating that the user has provided user input associated with a displayed user interface element via the handheld controller. This implementation of eye tracking calibration is based on the notion that, more often than not, a user is looking at a user interface element on the display panel(s) when the user provides user input associated with the user interface element, such as user input to highlight or select the user interface element. Accordingly, in some examples, the eye tracking system may be calibrated at times when the user provides user input associated with presented user interface elements because it is assumed that the user is looking at a displayed user interface element at a time at which the user input is provided. In some examples, the eye tracking system is calibrated in response to (e.g., within a threshold time after) presenting the user interface element. For instance, if the user interface element is a word of a message that the user is supposed to read because the message is key to playing a video game, it can be assumed that the user is likely looking at the word (e.g., the first word) of the message shortly after (e.g., milliseconds after, seconds after, etc.) the message is presented on the display panel(s) of the HMD. In some examples, the user interface element is presented contemporaneously with an associated sound that is designed to grab the user's attention, thereby increasing the likelihood that the user is looking at the user interface element shortly after the user interface element is presented. For example, the user interface element may be a graphic of an exploding bomb, and a corresponding sound of a loud explosion may be output via a speaker(s) of the HMD at a time of presenting the exploding bomb graphic on the display panel(s) of the HMD. As such, it can be assumed that the user is likely looking at the exploding bomb graphic shortly after (e.g., milliseconds after, seconds after, etc.) the exploding bomb graphic is presented on the display panel(s) because the sound of the loud explosion may alert the user and cause the user to reactively direct their gaze toward the exploding bomb graphic. These are merely examples of indicators and heuristics that can be used to determine times when the user is likely looking at a user interface element presented on the display panel(s) of the HMD. Accordingly, it is to be appreciated that the techniques, devices, and systems described herein are not limited to these specific examples.

In an example process for calibrating an eye tracking system, a processor(s) may present a user interface element on a display panel(s) of a HMD, and may receive, from a handheld controller, user input data indicating that a user wearing the HMD has provided user input associated with the user interface element via the handheld controller. In response to the receiving of the user input data from the handheld controller, the processor(s) may receive, from an eye tracking sensor(s) of the HMD, eye data associated with one or more eyes of the user, and may calibrate the eye tracking system based at least in part on the eye data and location data indicating a location on the display panel(s) where the user interface element is presented. In some examples, the eye tracking system is continuously calibrated in this manner throughout a session. For example, after calibrating the eye tracking system as described above, the processor(s) may execute an application(s) that uses the eye tracking system. At some point in time after the application (s) begins using the eye tracking system, the processor(s) may present a second user interface element, receive, from the handheld controller(s), second user input data associated with the second user interface element, receive second eye data associated with the eye(s) of the user in response to the receiving of the second user input data from the handheld controller, and recalibrate the eye tracking system based at least in part on the second eye data and second location data indicating a second location on the display panel(s) where the second user interface element is presented. This process of recalibrating the eye tracking system may iterate any suitable number of times over the duration of a session involving the user wearing the HMD (e.g., during gameplay of a video game, such as a VR video game).

The techniques, devices, and systems described herein enable improved eye tracking accuracy throughout a session involving a user wearing and using a HMD. For example, as the user wearing the HMD moves within an environment (e.g., during a VR gaming session), the user may move their head in different directions, and the HMID may slip, as described above. In some cases, especially at times farther into a session, the HMD may be more prone to slippage when the user starts to sweat. In such a scenario, the calibration of the eye tracking system, and the continuous recalibration of the eye tracking system throughout the session, helps maintain a level of eye tracking accuracy so that eye tracking works accurately through the session. For example, it is estimated that the techniques described herein can reduce the error of the eye tracking system from a range of about 10 to 15 degrees in visual angle around a gazed-upon target to a range of about 2.5 to 5 degrees in visual angle around the target, and this reduced error range can be maintained by periodically recalibrating the eye tracking system throughout a user's session, thereby improving eye tracking accuracy for a duration of a session. This constitutes an improvement to the functioning of a computer system that includes and/or utilizes the eye tracking system, as the techniques described herein allow for accurately determining the gaze of the user throughout a session. The techniques, devices, and systems described herein also improve eye tracking technology in the same regard.

Also disclosed herein are systems including a HMD configured to implement the techniques and processes disclosed herein, as well as non-transitory computer-readable media storing computer-executable instructions to implement the techniques and processes disclosed herein. Although the techniques and systems disclosed herein are often discussed, by way of example, in the context of video game applications, and specifically VR gaming applications, it is to be appreciated that the techniques and systems described herein may provide benefits with other applications, including, without limitation, non-VR applications (e.g., AR applications, MR applications, etc.), and/or non-gaming applications, such as industrial machine applications, defense applications, robotics applications, and the like.

FIG. 1 illustrates an example GUI-based technique for calibrating an eye tracking system, in accordance with embodiments disclosed herein. FIG. 1 depicts an example system 100 in which the techniques disclosed herein can be implemented for calibrating an eye tracking system. The system 100 may include a HMD 102. In some examples, the HMD 102 is a standalone HMD 102 (sometimes referred to as an "all-in-one" HMD 102) that includes most, if not all, of the components described herein, and that is operable without assistance, or with minimal assistance, from a separate computer(s). In these examples, the standalone HMD 102 may nevertheless be communicatively coupled with one or more handheld controllers 104, such as a first handheld controller 104(1) and a second handheld controller 104(2). In some examples, the system 100 is a distributed system that includes the HMD 102, the handheld controller(s) 104, and at least one additional computer that is separate from, yet communicatively coupled to, the HMD 102 and the handheld controller(s) 104. For example, the system 100 may include a host computer 106 communicatively coupled to the HMD 102 and the handheld controller(s) 104. In some examples, the host computer 106 may be collocated in the same environment as the HMD 102 and the handheld controller(s) 104, such as a household of a user 108 who is wearing the HMD 102 and holding the handheld controller(s) 104. The host computer 106, the HMD 102, and the handheld controller(s) 104 may be communicatively coupled together wirelessly and/or via a wired connection. For example, the devices 102/104/106 may exchange data using Wi-Fi, Bluetooth, radio frequency (RF), and/or any other suitable wireless protocol. Additionally, or alternatively, the devices 102/104/106 may include one or more physical ports to facilitate a wired connection (e.g., a tether, a cable(s), etc.) for data transfer therebetween. In some examples, the system 100 may include a remote system 110 in addition to, or in lieu of, a host computer 106 that is located in the environment of the HMD 102 and the handheld controller(s) 104. The remote system 110 may be communicatively coupled to the host computer 106 and/or to the HMD 102 via a wide-area network(s) 112, such as the Internet. Accordingly, the remote system 110 may represent one or more server computers that are located at one or more remote geographical locations with respect to the geographical location of the HMD 102 and the handheld controller(s) 104. In other examples, the network(s) 112 may represent a local area network (LAN), and, while the remote system 110 is considered to be remote from the HMD 102, the remote system 110 may be located in the same building as the HMD 102, for example.

The HMD 102, the handheld controller(s) 104, and the host computer 106 and/or the remote system 110 collectively represent a distributed system for executing an application (e.g., a video game) to render associated video content (e.g., a series of images) on a display panel(s) of the HMD 102 and/or to output sounds corresponding to audio content of the executing application via one or more speakers of the HMD 102. By being communicatively coupled together, the HMD 102, the handheld controller(s) 104, and the host computer 106 and/or the remote system 110 may be configured to work together in a collaborative fashion to output such video content and/or audio content via the HMD 102. Accordingly, at least some of the components, programs, and/or data described herein, such as a processor(s), an application(s) that is executable by the processor(s), or the like, can reside on the host computer 106 and/or on the remote system 110. Alternatively, as mentioned above, the components, programs, and/or data can reside entirely on the HMD 102, such as in a standalone HMD 102. The host computer 106 and/or the remote system 110 can be implemented as any type of computing device and/or any number of computing devices, including, without limitation, a personal computer (PC), a laptop computer, a desktop computer, a portable digital assistant (PDA), a mobile phone, tablet computer, a set-top box, a game console, a server computer, a wearable computer (e.g., a smart watch, etc.), or any other electronic device that can transmit/receive data.

In some examples, the HMD 102 may represent a VR headset for use in VR systems, such as for use with a VR gaming system. However, the HMD 102 may additionally, or alternatively, be implemented as an AR headset for use in AR applications, a MR headset for use in MR applications, or a headset that is usable for VR, AR, and/or MR applications that are not game-related (e.g., industrial applications, robot applications, military/weapon applications, medical applications, or the like). In AR, a user 108 sees virtual objects overlaid on a real-world environment, whereas, in MR, the user 108 sees an interactive view of combined real-world and computer-generated elements, and in VR, the user 108 does not typically see a real-world environment, but is fully immersed in a virtual environment, as perceived via the display panel(s) 114 and the optics (e.g., lenses) of the HMD 102. It is to be appreciated that, in some VR systems, pass-through imagery of the real-world environment of the user 108 may be displayed in conjunction with virtual imagery to create an augmented VR environment in a VR system, whereby the VR environment is augmented with real-world imagery (e.g., overlaid on a virtual world), and/or the user 108 may be able to toggle between viewing a virtual environment and their real-world environment. Examples described herein pertain primarily to a VR-based HMD 102, but it is to be appreciated that the HMD 102 is not limited to implementation in VR applications.

FIG. 1 depicts a display panel(s) 114, as well as an eye tracking sensor(s) 116, each of which may be components of the HMD 102. FIG. 1 further depicts an eye tracking system 118 that is configured to utilize the eye tracking sensor(s) 116 for tracking the eyes of the user 108 who is wearing the HMD 102. The eye tracking system 118 may be part of the system 100. In some examples, the eye tracking system 118 utilizes software (e.g., an eye tracking program) that executes on the HMD 102 and/or on the host computer 106 and/or on the remote system 110. It is also to be appreciated that the system 100 may include additional and/or alternative components not shown in FIG. 1, such as those discussed in more detail below with respect to FIG. 6. As indicated by the encircled number 1 in FIG. 1, and during use of the HMD 102 by the user 108 who is wearing the HMD 102, a processor(s) of the system 100 may present a user interface element 120 on the display panel(s) 114 of the HMD 102. It is to be appreciated that the HMD 102 may include a single display panel 114 or multiple display panels 114, such as a left display panel and a right display panel of a stereo pair of display panels 114. The one or more display panels 114 of the HMD 102 may be used to present a series of image frames (sometimes referred to herein as "images" or "frames") that are viewable by the user 108 wearing the HMD 102. It is to be appreciated that the HMD 102 may include any number of display panels 114 (e.g., more than two display panels, a pair of display panels, or a single display panel). Hence, the terminology "display panel," as used in the singular herein, may refer to either display panel 114 of a pair of display panels of a two-panel HMD 102, or it may refer to a single display panel 114 of a HMD 102 with any number of display panels (e.g., a single-panel HMD 102 or a multi-panel HMD 102). In a two-panel HMD 102, a stereo frame buffer may render pixels on both display panels of the HMD 102 such that the user interface element 120 is presented on both display panels 114, yet the user 108 interprets the user interface element 120 as a single user interface element 120, as seen through stereo vision. In a single-panel HMD 102, the HMD 102 may include a single display panel 114 and a pair of lenses, one for each eye to view a corresponding image displayed on a portion of the display panel 114.

In the example of FIG. 1, the user interface element 120 is an interactive element (e.g., a soft button that is selectable by the user 108) with text that reads: "LOAD." This user interface element 120, or any similar user interface element, may be presented during a session involving the user 108, while the user 108 is using the HMD 102 (e.g., during gameplay of a video game, such as a VR video game). In some examples, the user 108 may interact with the interactive element 120 using one or more of the handheld controllers 104. For example, the user 108 may provide user input associated with the user interface element 120 via the handheld controller(s) 104 to highlight the user interface element 120 and/or to select the user interface element 120, or to otherwise interact with the user interface element 120 in some other way (e.g., drag the user interface element 120 across the screen). The individual handheld controller(s) 104 may have various finger-operated and/or hand-operated controls for the user 108 to provide user input associated with the user interface element 120, as described herein. For example, the handheld controller(s) 104 may include a joystick(s), a trackpad(s), a trackball(s), a button(s), a directional pad(s) (D-pad(s)), a trigger(s), a bumper(s), a proximity sensor(s) (e.g., to detect finger position, finger movement, finger gestures, etc.), a pressure sensor(s) (e.g., to detect hard presses and/or squeezing of portions of the handheld controller(s) 104, such as the handle), a motion sensor(s), such as an accelerometer(s), gyroscope(s), or the like to detect movement (e.g., translational movement, rotational movement (e.g., tilting), etc.) of the handheld controller(s) 104 in space, and/or any other suitable type of control.

Figure 2:
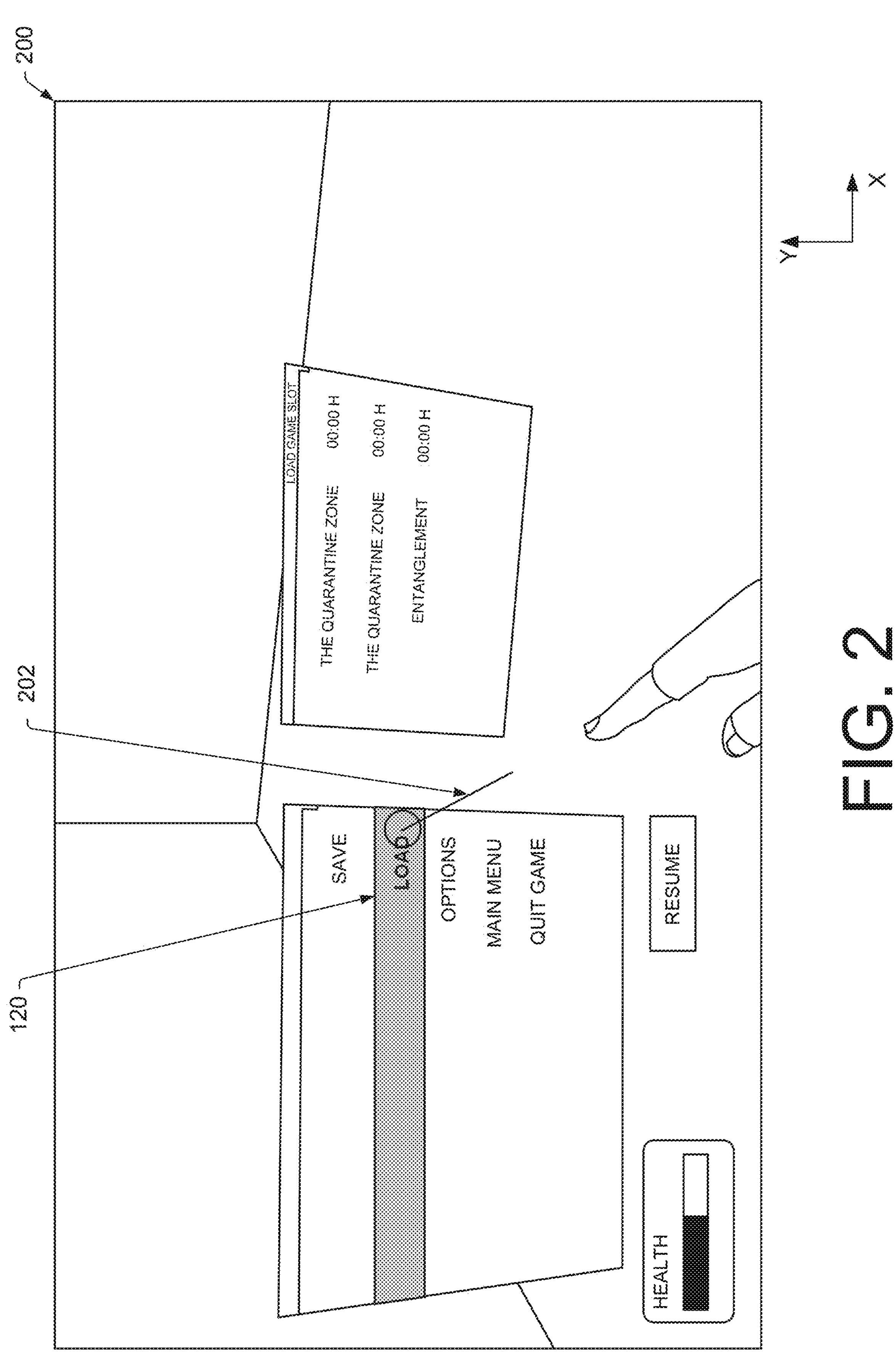
FIG. 2 illustrates an example GUI of a HMD while a user is providing user input via a handheld controller to highlight and/or select a user interface element presented in the GUI, in accordance with embodiments disclosed herein.

With brief reference to FIG. 2, there is illustrated an example GUI 200, which may be displayed on the display panel(s) 114 of the IMID 102. In the example of FIG. 2, the user 108 is shown as providing user input via the handheld controller(s) 104 to highlight and/or select the user interface element 120 presented in the GUI 200. This interaction of the user 108 and the user interface element 120 can occur in many ways, such as the user 108 moving the handheld controller(s) 104(1) in space until a pointer 202 (e.g., a cursor, mouse, pointing icon, etc.) moves over the user interface element 120. Although the user interface element 120 in the example GUI 200 of FIG. 2 is depicted as a button that spans a relatively long distance in the X-direction, the user interface element 120, for purposes of implementing the techniques described herein, may be considered to be a portion of the button, such as the portion of the button that includes the text "LOAD," in the example of FIG. 2. This portion of the user interface element 120 may be a portion that the user 108 is likely to look at during an interaction of the user 108 with the user interface element 120. In some examples, movement of the pointer 202 over the user interface element 120 causes the processor(s) of the system 100 to highlight the user interface element 120 on the display panel(s) 114, such as by changing a color of the user interface element 120, increasing an intensity of the color of the user interface element 120, changing the text (e.g., "LOAD") to bold, underlining the text, causing the user interface element 120 to "pop-out" from a background scene and/or to "pop-out" relative to surrounding user interface elements, or the like. In some examples, the user 108 may provide additional user input via the handheld controller(s) 104 to select the user interface element 120, such as by actuating a button (e.g., pressing or clicking the "A" button, pulling a trigger, providing a gesture, such as tapping (e.g., double tapping) the trackpad, squeezing the handle, etc.). In some examples, the user 108 may select the user interface element 120 by hovering the pointer 202 over the user interface element 120 and maintaining the pointer 202 in that position for a threshold period of time (e.g., for at least N seconds). In some examples, these highlighting and selection actions are performed as part of execution of the application (e.g., as part of a game engine).

Returning with reference to FIG. 1, and as indicated by the encircled number 2 in FIG. 1, the processor(s) of the system 100 may receive, from the handheld controller(s) 104, user input data indicating that the user 108 has provided user input associated with the user interface element 120 via the handheld controller(s) 104. For example, as mentioned above with reference to FIG. 2, the user input provided via the handheld controller(s) 104 may be to highlight the user interface element 120 and/or to select user interface element 120, and/or to otherwise interact with the user interface element 120 in some other way. When the user 108 provides such user input, the user 108 is likely looking at the user interface element 120 (e.g., the text "LOAD") and/or the portion of the user interface element 120 at which the pointer 202 is pointed in FIG. 2. These are merely example of the user interface element 120 and types of user input that may be provided, and it is to be appreciated that the user interface element 120 can take other forms and/or that other types of user input can be provided via the handheld controller(s) 104 to cause the processor(s) to receive the user input data from the handheld controller(s) 104. For example, in a first-person shooter video game, the user interface element 120 may be a sight of a virtual weapon that a player-controlled character is holding and aiming at a virtual target, and the user input data received by the processor(s) from the handheld controller(s) 104 may indicate that the user 108 has provided user input via the handheld controller(s) 104 to fire the virtual weapon, such as by pulling a trigger of the handheld controller(s) 104, selecting the "A" button of the handheld controller(s) 104, or the like. In this example, the user 108 is likely looking at the sight of the virtual weapon presented on the display panel(s) 114 when the user 108 pulls the trigger to fire the weapon. In yet another example, the user 108 may provide user input via the handheld controller(s) 104 to grab and/or throw the user interface element 120 (e.g., a virtual object), and in this example, the user 108 is likely looking at the virtual object while the user input is being provided to grab and/or through the virtual object. In general, the processor(s) of the system 100 may determine that the user 108 is likely looking at the user interface element 120 at or near a time of receiving, from the handheld controller(s) 104, the user input data indicating that the user 108 has provided user input associated with the user interface element 120 via the handheld controller(s) 104.

As indicated by the encircled number 3 in FIG. 1, and in response to receiving the user input data from the handheld controller(s) 104, the processor(s) of the system 100 receives, from the eye tracking sensor(s) 116, eye data 122 associated with one or more eyes 124 of the user 108. In some examples, the eye tracking sensor(s) 116 is/are disposed inside the HMD 102. In some examples, the eye tracking sensor(s) 116 is/are a camera(s) or another type of optical sensor(s) aimed at the eye(s) 124 of the user 108 wearing the HMD 102. In these examples, the eye tracking system 118 may implement a VOG-based eye tracking algorithm. The specific eye tracking algorithm employed by the eye tracking system 118 can vary depending on the implementation. In some examples, the eye data 122 is image data representing one or more images of the eye(s) 124 (e.g., one or more images captured by a camera(s)). In some examples, a light source emits light towards the eye(s) 124, and the eye tracking sensor(s) 116 detects light reflected from the eye(s) 124. In some examples, the eye tracking sensor(s) 116 is an infrared (IR) camera(s) configured to detect IR light that is emitted by an IR light source and reflected back towards the IR camera from the eye(s) 124 of the user 108. Accordingly, the eye data 122 can be IR image data, in some examples. In some examples, the processor(s) of the system 100 receives the eye data 122 from the eye tracking sensor(s) 116 within a threshold time after receiving the user input data from the handheld controller(s) 104 (e.g., at the encircled number 2 in FIG. 1). For example, the eye data 122 may be received by the processor(s) within a fraction of a millisecond of the receipt of the user input data from the handheld controller(s) 104, within milliseconds of the receipt of the user input data from the handheld controller(s) 104, within seconds of the receipt of the user input data from the handheld controller(s) 104, or the like.

As indicated by the encircled number 4 in FIG. 1, the processor(s) of the system 100 calibrates the eye tracking system 118 based at least in part on the eye data 122 and location data 126 indicating a location 128 (e.g., X and Y coordinates, row and column pixel location(s), etc.) on the display panel(s) 114 where the user interface element 120 is presented. Calibrating the eye tracking system 118 may include adjusting the correlation or mapping from eye data 122 generated by the eye tracking sensor(s) 116 (or an analysis result thereof) to eye tracking data indicative of where the user 108 is looking (e.g., a gaze point 130, a gaze angle, a gaze vector 132, the location 128 on the display panel(s) 114, or the like). The known location 128 on the display panel(s) 114 where the user interface element 120 is presented can be taken as a "source of truth" that describes where the eye(s) 124 is looking (based on the assumption that the user 108 is looking at the user interface element 120 when the eye data 122 is generated by the eye tracking sensor(s) 116). In some examples, calibrating the eye tracking system 118 includes changing a value(s) of a term(s), a parameter(s), or the like, such as a term(s) of a mapping function, a parameter(s) of a machine learning model(s), or the like. In some examples, calibrating the eye tracking system 118 includes updating and/or retraining a machine learning model(s). In some examples, calibrating the eye tracking system 118 includes resetting the eye data 122 that corresponds to an origin or reference point that is used to define where the user 108 is looking in terms of a gaze angle relative to that origin/reference point. For example, if the location 128 on the display panel(s) 114 where the user interface element 120 is presented corresponds to a gaze angle of +10 degrees from the origin/reference point (e.g., the center of the display panel(s) 114), then the eye data 122 generated at a time when the user 108 is looking at the user interface element 120 can be correlated with the gaze angle of +10 degrees, and eye data 122 that is offset or shifted from the eye data 122 by an amount that corresponds −10 degrees in gaze angle can be correlated with the origin/reference point to calibrate the eye tracking system 118. Because the specific eye tracking algorithm employed by the eye tracking system 118 can vary depending on the implementation, it is to be appreciated that the specific manner of calibrating the eye tracking system 118 can also vary depending on the specific eye tracking algorithm employed. In some examples, an eye tracking algorithm utilized by the eye tracking system 118 analyzes the eye data 122 generated by the eye tracking sensor(s) 116 to identify the pupil(s) of the eye(s) 124 and/or other landmarks to determine eye orientation, three-dimensional (3D) position of the eye(s) 124, interpupillary distance, interocular distance, motion vectors, magnitude of torsion and rotation (i.e., roll, pitch, and yaw), or the like. Accordingly, the calibration of the eye tracking system 118 may include correlating or mapping any one (or more) of these analysis results (i.e., determined as a result of analyzing the eye data 122) to eye tracking data 122 indicative of where the user 108 is looking (e.g., a gaze point 130, a gaze angle, a gaze vector 132, the location 128 on the display panel(s) 114, or the like). In some examples, calibrating the eye tracking system 118 includes updating a range of values that correspond to any one or more of these analysis results (e.g., values that correspond to the eye(s) 124 looking at the left edge of the display panel(s) 114 to values that correspond to the eye(s) 124 looking at the right edge of the display panel(s) 114, and/or values that correspond to the eye(s) 124 looking at the bottom edge of the display panel(s) 114 to values that correspond to the eye(s) 124 looking at the top edge of the display panel(s) 114, or a combination thereof). The purpose of calibrating the eye tracking system 118 is to adjust or reset the eye tracking system 118 so that it works accurately (e.g., by reducing the error in visual angle around a gazed-upon target), which results in a more comfortable and higher-fidelity experience for the user 108 when eye tracking is utilized.

As mentioned above, the calibration of the eye tracking system 118 is continuous (or "embedded") in the sense that the eye tracking calibration occurs in parallel with the eye tracking algorithm employed by the eye tracking system 118, and the eye tracking calibration is performed iteratively during a session (e.g., during gameplay). This addresses the issue of repetitive slippage of the HMD as the user 108 moves their head during the session. The continuous (or embedded) nature of the eye tracking calibration also results in maintaining the accuracy of the eye tracking system 118 throughout a session. Since users (e.g., the user 108) frequently interact with user interface elements 120 (e.g., by providing user input via the handheld controller(s) 104), the eye tracking calibration techniques described herein provide a convenient and natural way to calibrate (and recalibrate) the eye tracking system 118 throughout a session. It is expected that the accuracy of the eye tracking system 118 is likely to be at its worst at the beginning of a session (e.g., when the user 108 initially dons the HMD 102). As such, the initial calibration may reduce the eye tracking error by a relatively large amount (e.g., by as much as 20 degrees or more in visual angle around a gazed-upon target) at the beginning of a session, but subsequent recalibration of the eye tracking system 118 is likely to correct the eye tracking error by much smaller amounts, such as corrections on the order of 5 degrees or less in visual angle around a gazed-upon target. Accordingly, depending on the frequency at which eye calibration is calibrated (and recalibrated) throughout a session, the accuracy of the eye tracking system 118 can be prevented from degrading to a point where eye tracking is unusable (e.g., due to an above-threshold error). Instead, the techniques, devices, and systems described herein can maintain the eye tracking error within a relatively small error range, such as an error of 1.5 to 3 degrees in visual angle around a gazed-upon target. Furthermore, the calibration of the eye tracking system 118 can be performed as a discrete calibration step or as a smooth adjustment (e.g., using a sliding window average, a weighted adjustment, etc.) to gradually adjust the eye tracking system 118 from a current state to a calibrated state where the eye tracking system 118 accurately track where the user 108 is looking (within a tolerable, below-threshold error). In some examples, an initial calibration may benefit from the aforementioned smooth adjustment. In some examples, the aforementioned smooth adjustment for calibration may be beneficial for certain eye tracking applications where the user 108 is more likely to notice a large correction.

The processes described herein are illustrated as a collection of blocks in a logical flow graph, which represent a sequence of operations that can be implemented in hardware, software, firmware, or a combination thereof (i.e., logic). In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 3:
FIG. 3 is a flow diagram of an example process for calibrating an eye tracking system based on a user interface element presented on a display panel(s) of a HMID, in accordance with embodiments disclosed herein.
Figure 3:
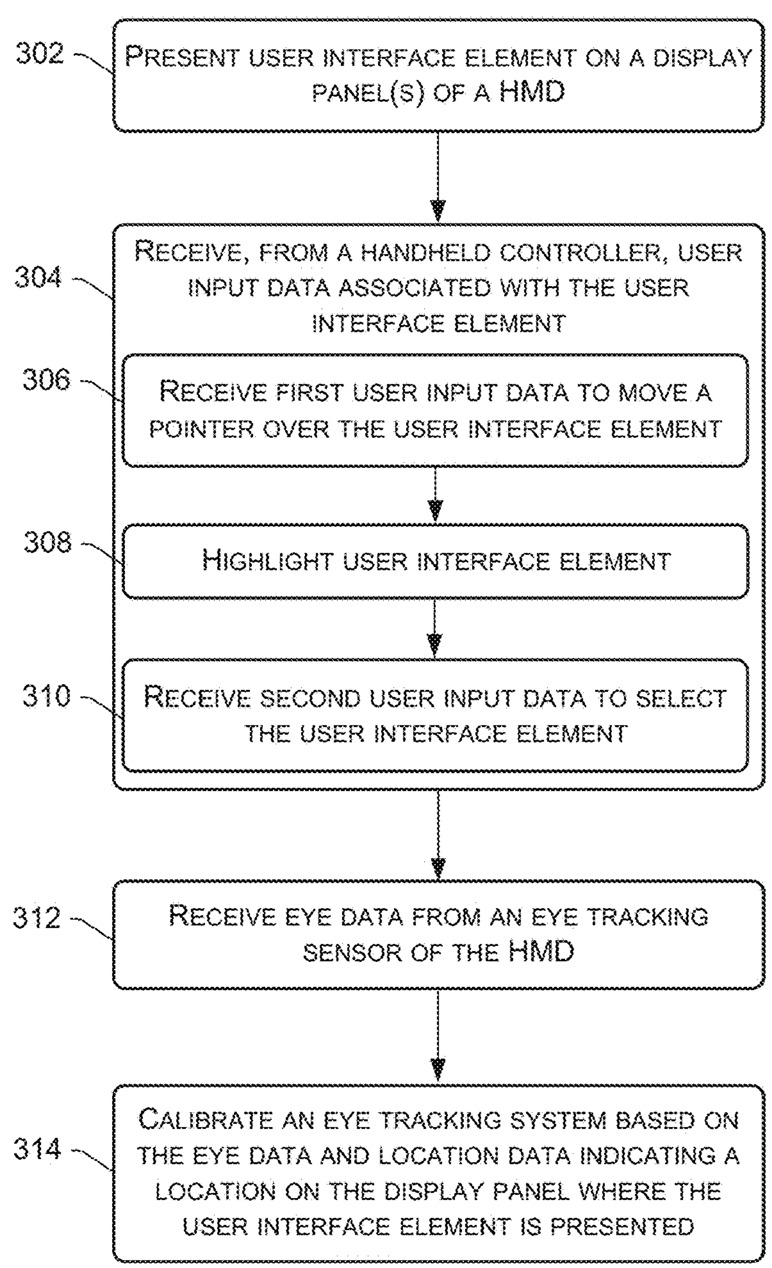

FIG. 3 is a flow diagram of an example process 300 for calibrating an eye tracking system 118 based on a user interface element 120 presented on a display panel(s) 114 of a HMD 102, in accordance with embodiments disclosed herein. For discussion purposes, the process 300 is described with reference to the previous figures. Furthermore, the process 300 may be implemented by the system 100 described herein.

At 302, a processor(s) of the system 100 may present a user interface element 120 on a display panel(s) 114 of a HMD 102. In some examples, the user interface element 120 is presented in a series of frames rendered by an application (e.g., a video game) that is being executed by the processor(s) to cause display of corresponding images on the display panel(s) 114 of the HMD 102, such as images corresponding to video game content of a VR video game. In some examples, the user interface element 120 is presented during gameplay of a video game (e.g., a VR video game) on the HMD 102. The user interface element 120 can be displayed at a particular location 128 on the display panel(s) 114 and may include any suitable type of user interface element 120 including a button, a window, text, an icon, a symbol, a graphic, a sight of a weapon (e.g., a virtual weapon in a first-person shooter video game), a virtual object (e.g., an object of a video game), or the like. In some examples, the user interface element 120 is an interactive element. For example, the user 108 may be able to interact with the interactive element 120 using one or more of the handheld controllers 104 (e.g., to highlight the element 120, select the element 120, drag the element 120, grab the element 120, throw the element 120, etc.). In some examples, the user interface element 120 is an element that is normally presented during a session involving the user 108, while the user 108 is using the HMD 102 (e.g., during gameplay of a video game, such as a VR video game). In this sense, the user interface element 120 is not indicated to the user 108 as being a calibration target, and the use of the user interface element 120 for eye tracking calibration can therefore remain inconspicuous to the user 108.

At 304, the processor(s) may receive, from a handheld controller(s) 104, user input data indicating that a user 108 wearing the HMD 102 has provided user input associated with the user interface element 120 via the handheld controller(s) 104. In some examples, the user input is to select the user interface element 120. In some examples, the user input is to highlight the user interface element 120. In some examples, the user interface element 120 is a sight of a weapon (e.g., a virtual weapon) in a first-person shooter video game, and the user input is to fire the weapon. In some examples, the user interface element 120 is a virtual object, and the user input is to grab and/or throw the virtual object. In some examples, sub-blocks 306-310 may be performed as part of the receiving of the user input data associated with the user interface element 120 at block 304.

At 306, for example, the processor(s) may receive, from the handheld controller(s) 104, first user input data indicating that the user 108 has provided first user input via the handheld controller(s) 104 to move a pointer 202 over the user interface element 120. For example, the user 108 may provide user input to the handheld controller(s) 104 to move (and hover) a pointer 202 (e.g., a cursor, mouse, pointing element, etc.) over the user interface element 120. In some examples, such user input may involve the user 108 moving the handheld controller(s) 104 in space (e.g., from a first position in the space to a second position in the space). When the user provides this first user input (e.g., when the pointer 202 is moved over the user interface element 120), the user 108 is likely looking at the user interface element 120.

At 308, for example, the processor(s) may highlight, in response to the receiving of the first user input data, the user interface element 120 on the display panel(s) 114. The user's 108 attention may be naturally drawn to the highlighted user interface element 120 at block 308, thereby causing the user's 108 eyes 124 to gaze upon the highlighted user interface element 120. In this sense, the likelihood that the user 108 is looking at the user interface element 120 is increased when the element 120 is highlighted on the display panel(s) 114 of the HMD 102. Highlighting the user interface element 120 at block 308 may include changing a color of the user interface element 120, increasing an intensity of the color of the user interface element 120, changing text of the element 120 to bold (e.g., bold font), underlining the text, causing the user interface element 120 to "pop-out" from a background scene and/or to "pop-out" relative to surrounding user interface elements, or the like.

At 310, for example, the processor(s) may receive, from the handheld controller(s) 104, second user input data indicating that the user 108 has provided second user input via the handheld controller(s) 104 to select the user interface element 120. For example, the user 108 may, at block 310, actuate a button (e.g., press or click the "A" button, pull a trigger, provide a gesture, such as tapping (e.g., double tapping) the trackpad, squeezing the handle, etc.). In some examples, the user 108 may select the user interface element 120 by hovering the pointer 202 over the user interface element 120 and maintaining the pointer 202 in that position for a threshold period of time (e.g., for at least N seconds).

At 312, the processor(s) may receive, from an eye tracking sensor(s) 116 of the HMD 102, eye data 122 associated with one or more eyes 124 of the user 108. In some examples, the eye data 122 is received in response to receiving the user input data from the handheld controller(s) 104 at block 304. In some examples, the eye data 122 is received within a threshold time (e.g., a fraction of a millisecond, milliseconds, seconds, etc.) after receiving the user input data at block 304. In some examples, the eye data 122 is received in response to receiving the first user input at block 306, in response to highlighting the user interface element 120 at block 308, and/or in response to receiving the second user input data at block 310. In some examples, the eye data 122 is received within a threshold time (e.g., a fraction of a millisecond, milliseconds, seconds, etc.) after receiving the first user input at block 306, highlighting the user interface element 120 at block 308, and/or receiving the second user input data at block 310. In some examples, the eye tracking sensor(s) 116 is/are a camera(s), and the eye data 122 is, or includes, image data (e.g., IR image data) of the one or more eyes 124 of the user 108.

At 314, the processor(s) may calibrate the eye tracking system 118 based at least in part on the eye data 122 and location data 126 indicating a location 128 on the display panel(s) 114 where the user interface element 120 is presented. Calibrating the eye tracking system 118 at block 314 may include adjusting the correlation or mapping from eye data 122 generated by the eye tracking sensor(s) 116 (or an analysis result thereof) to eye tracking data indicative of where the user 108 is looking (e.g., a gaze point 130, a gaze angle, a gaze vector 132, the location 128 on the display panel(s) 114, or the like). In some examples, calibrating the eye tracking system 118 at block 314 includes changing a value(s) of a term(s), a parameter(s), or the like, such as a term(s) of a mapping function, a parameter(s) of a machine learning model(s), or the like. In some examples, calibrating the eye tracking system 118 at block 314 includes updating and/or retraining a machine learning model(s). In some examples, calibrating the eye tracking system 118 at block 314 includes resetting the eye data 122 that corresponds to an origin or reference point that is used to define where the user 108 is looking in terms of a gaze angle relative to that origin/reference point. For example, if the location 128 on the display panel(s) 114 where the user interface element 120 is presented corresponds to a gaze angle of +10 degrees from the origin/reference point (e.g., the center of the display panel(s) 114), then the eye data 122 received at block 312 can be correlated with the gaze angle of +10 degrees, and eye data 122 that is offset or shifted from the eye data 122 received at block 312 by an amount that corresponds −10 degrees in gaze angle can be correlated with the origin/reference point to calibrate the eye tracking system 118 at block 314. Because the specific eye tracking algorithm employed by the eye tracking system 118 can vary depending on the implementation, it is to be appreciated that the specific manner of calibrating the eye tracking system 118 at block 314 can also vary depending on the specific eye tracking algorithm employed. In some examples, an eye tracking algorithm utilized by the eye tracking system 118 analyzes the eye data 122 generated by the eye tracking sensor(s) 116 to identify the pupil(s) of the eye(s) 124 and/or other landmarks to determine eye orientation, 3D position of the eye(s) 124, interpupillary distance, interocular distance, motion vectors, magnitude of torsion and rotation (i.e., roll, pitch, and yaw), or the like. Accordingly, the calibration of the eye tracking system 118 at block 314 may include correlating or mapping any one (or more) of these analysis results (i.e., determined as a result of analyzing the eye data 122) to eye tracking data 122 indicative of where the user 108 is looking (e.g., a gaze point 130, a gaze angle, a gaze vector 132, the location 128 on the display panel(s) 114, or the like). In some examples, calibrating the eye tracking system 118 at block 314 includes updating a range of values that correspond to any one or more of these analysis results (e.g., values that correspond to the eye(s) 124 looking at the left edge of the display panel(s) 114 to values that correspond to the eye(s) 124 looking at the right edge of the display panel(s) 114, and/or values that correspond to the eye(s) 124 looking at the bottom edge of the display panel(s) 114 to values that correspond to the eye(s) 124 looking at the top edge of the display panel(s) 114, or a combination thereof). The purpose of calibrating the eye tracking system 118 at block 314 is to adjust or reset the eye tracking system 118 so that it works accurately (e.g., by reducing the error in visual angle around a gazed-upon target), which results in a more comfortable and higher-fidelity experience for the user 108 when eye tracking is utilized.

Figure 4:
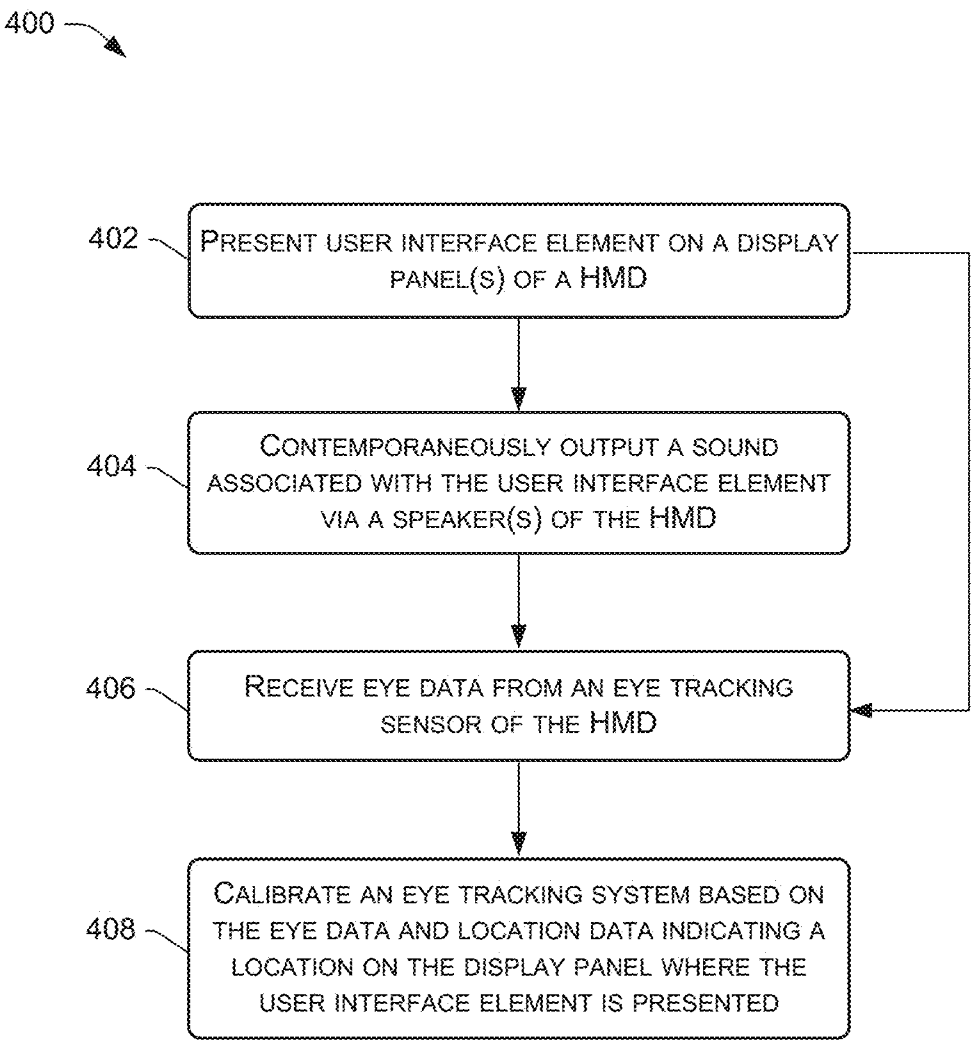
FIG. 4 is a flow diagram of another example process for calibrating an eye tracking system based on a user interface element presented on a display panel(s) of a HMID, in accordance with embodiments disclosed herein.

FIG. 4 is a flow diagram of another example process 400 for calibrating an eye tracking system 118 based on a user interface element 120 presented on a display panel(s) 114 of a HMD 102, in accordance with embodiments disclosed herein. For discussion purposes, the process 400 is described with reference to the previous figures. Furthermore, the process 400 may be implemented by the system 100 described herein. It is also to be appreciated that the process 400 can be performed in conjunction with the process 300.

At 402, a processor(s) of the system 100 may present a user interface element 120 on a display panel(s) 114 of a HMD 102. The operation(s) performed at block 402 may be similar to those performed at block 302 of the process 300 and described above.

At 404, in some examples, the processor(s) may output (e.g., audibly) via a speaker(s) of the HMD 102, at a time of presenting of the user interface element 120 at block 402, a sound(s) associated with the user interface element 120. For example, the user interface element 120 presented at block 402 may be a graphic of an exploding bomb, and, at block 404, a corresponding sound of a loud explosion may be output via a speaker(s) of the HMD 102 at a time of presenting the exploding bomb graphic on the display panel(s) 114 of the HMD 102. The sound of the loud explosion, for example, may alert the user 108 and cause the user 108 to reactively direct their gaze toward the exploding bomb graphic, which may increase the likelihood that the user 108 is looking at the exploding bomb graphic shortly after (e.g., milliseconds after, seconds after, etc.) the exploding bomb graphic is presented on the display panel(s) 114 at block 402.

At 406, the processor(s) may receive, from an eye tracking sensor(s) 116 of the HMD 102, eye data 122 associated with one or more eyes 124 of the user 108. The operation(s) performed at block 406 may be similar to those performed at block 312 of the process 300 and described above. Additionally, the eye data 122 may be received at block 406 in response to the presenting of the user interface element 120 at block 402. In some examples, the eye data 122 is received within a threshold time (e.g., a fraction of a millisecond, milliseconds, seconds, etc.) after the presenting of the user interface element 120 at block 402. In an illustrative example, the user interface element 120 is a word of a message for the user 108 to read, such as message that is key to playing a video game. In this example, the eye data 122 can be received at block 406 within a threshold time (e.g., a fraction of a millisecond, milliseconds, seconds, etc.) after the presenting of the message at block 402 because it is likely that the user 108 is looking at a word (e.g., the first word) of the message shortly after the message is presented on the display panel(s) 114 of the HMD 102. In this example, the process 400 may proceed directly from block 402 to block 406 without performing the operation(s) at block 404 (as indicated by the arrow from block 402 to block 406), but a sound (e.g., an audible bell sound) may be output contemporaneously with the presentation of the message, in some examples, in which case block 404 is performed in the process 400. In some examples, the eye data 122 may be received at block 406 in response to the outputting of the sound at block 404. In some examples, the eye data 122 is received within a threshold time (e.g., a fraction of a millisecond, milliseconds, seconds, etc.) after the outputting of the sound at block 404.

At 408, the processor(s) may calibrate the eye tracking system 118 based at least in part on the eye data 122 and location data 126 indicating a location 128 on the display panel(s) 114 where the user interface element 120 is presented. The operation(s) performed at block 408 may be similar to those performed at block 314 of the process 300 and described above.

Accordingly, the process 400 may not involve receiving user input from the user 108 via the handheld controller(s) 104, in contrast with the process 300 of FIG. 3. The process 400 is, therefore, based on the notion that a characteristic of the user interface element 120 and/or a sound associated with the user interface element 120 that is contemporaneously output along with the presentation of the user interface element 120, may draw the user's 108 attention to the user interface element 120, thereby increasing the likelihood that the user 108 is looking at the user interface element 120 at or near the time the element 120 is presented.

Figure 5:
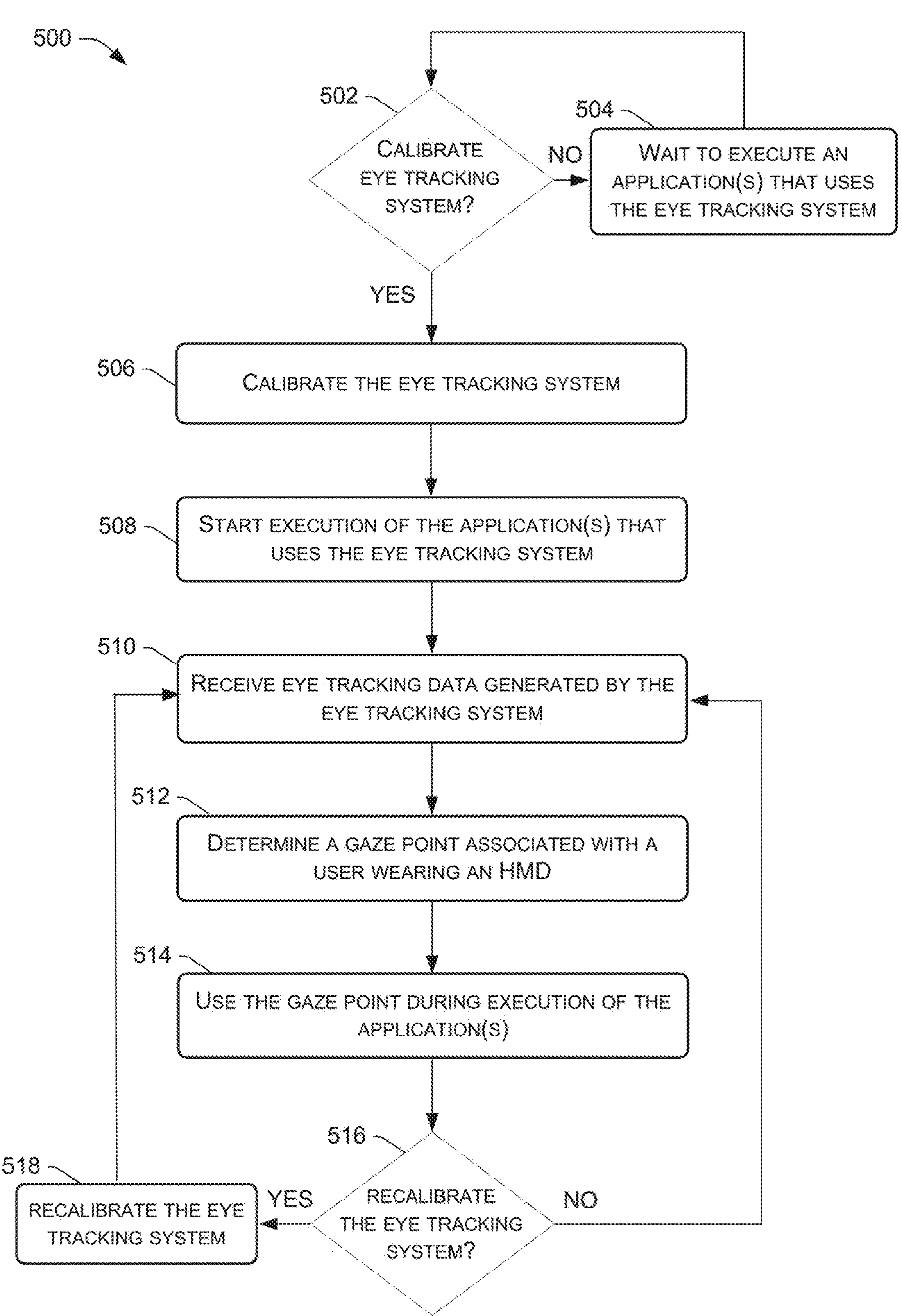
FIG. 5 is a flow diagram of an example process for continuously calibrating an eye tracking system while a user is using a HMD, in accordance with embodiments disclosed herein.

FIG. 5 is a flow diagram of an example process 500 for continuously calibrating an eye tracking system 118 while a user 108 is using a HMD 102, in accordance with embodiments disclosed herein. For discussion purposes, the process 500 is described with reference to the previous figures. Furthermore, the process 500 may be implemented by the system 100 described herein. It is also to be appreciated that the process 500 can be performed in conjunction with the process 300 and/or the process 400.

At 502, a processor(s) of the system 100 may determine whether to calibrate the eye tracking system 118. For example, the determination at block 502 may be based upon whether a user interface element 120 that is suitable for use in calibrating the eye tracking system 118 is being presented or not and/or whether user input data associated with the user interface element 120 has been received from the handheld controller(s) 104 or not. In some examples, an eye tracking calibration component(s) (e.g., See 618 in FIG. 6, below) may hook into an application(s) (e.g., a video game) such that, during execution of the application(s) (e.g., the video game), the eye tracking calibration component(s) can determine whether certain user interface elements 120 (e.g., interactive elements) are being presented during a session involving execution of the application(s) (e.g., during gameplay). In this manner, as soon as a user interface element 120 is presented, the eye tracking calibration component(s) can start monitoring for receipt, from the handheld controller(s) 104, of user input data associated with the user interface element 120, and if such user input data is received from the handheld controller(s) 104, the processor(s) may determine to calibrate the eye tracking system 118 at block 502. In other words, calibration of the eye tracking system 118 may be triggered, at block 502, by the receipt, from the handheld controller(s) 104, of user input data associated with a displayed user interface element 120. In any case, if the determination at block 502 is to refrain from calibrating the eye tracking system 118, the process 500 may follow the NO route from block 502 to block 504.

At 504, the processor(s) may wait to execute (or otherwise refrain from executing) an application(s) that uses the eye tracking system 118 until the eye tracking system 118 is calibrated. For example, if an application (e.g., a video game), when executed, is configured to use the eye tracking system 118 (e.g., for foveated transport, aim-assist, expressive avatars, eye-gaze-based auto scrolling, etc.), the processor(s) may wait to execute such an application(s) until the eye tracking system 118 is calibrated. Accordingly, the process 500 may return to block 502 following block 504 to iterate the determination at block 502. If and when the determination at block 502 is to calibrate the eye tracking system 118, the process 500 may follow the YES route from block 502 to block 506.

At 506, the processor(s) may calibrate the eye tracking system 118. For example, the process 300 of FIG. 3 may be performed at block 506. Additionally, or alternatively, the process 400 of FIG. 4 may be performed at block 506. That is, the eye tracking system 118 may be calibrated based at least in part on a user interface element 120, as described herein. Accordingly, the determination to calibrate the eye tracking system 118 at block 502 may be based at least in part on the presentation of a user interface element 120 at block 302 and/or the receipt of the user input data from the handheld controller(s) 104 at block 304 of the process 300, or the determination to calibrate the eye tracking system 118 at block 502 may be based at least in part on the presentation of the user interface element 120 at block 402 and/or the output of a corresponding sound(s) at block 404 of the process 400.

At 508, the processor(s) may start execution of the application(s) that uses the eye tracking system 118. For example, the execution of the application(s) (e.g., a video game) that uses eye tracking may start at block 508 after the eye tracking system 118 is calibrated, which ensures that eye tracking is accurate during use of the eye tracking system 118 by the executing application(s).

At 510, the processor(s) may receive eye tracking data generated by the eye tracking system 118. As noted above, the eye tracking data may indicate where the user 108 is looking in real-time. For example, the eye tracking data received at block 510 may indicate a gaze point 130, a gaze angle, a gaze vector 132, a location 128 on the display panel(s) 114, or the like.

At 512, the processor(s) may determine, based at least in part on eye tracking data generated by the eye tracking system 118, a gaze point 130, a gaze angle, a gaze vector 132, a location 128 on the display panel(s) 114, or the like associated with the user 108. For example, the eye tracking data output by the eye tracking system 118 may be processed to determine where the user 108 is looking.

At 514, the processor(s) may use the gaze point 130, gaze angle, gaze vector 132, location 128 on the display panel(s) 114, or the like during execution of the application(s) (i.e., the application(s) that uses the eye tracking system 118). For example, a gaze point 130 may be used during execution of a VR video game for foveated transport to determine which pixel data for an image frame should not be sent over a wireless link based on where the user 108 is not, or will not be, looking.

At 516, the processor(s) may determine whether to recalibrate the eye tracking system 118. The determination at block 516 may be based on a similar criterion (or criteria) to the criterion (or criteria) used in the determination at block 502. For example, the determination at block 516 may be based upon whether a user interface element 120 that is suitable for use in recalibrating the eye tracking system 118 is being presented or not and/or whether user input data associated with the user interface element 120 has been received from the handheld controller(s) 104 or not. If the determination at block 516 is to refrain from recalibrating the eye tracking system 118, the process 500 may follow the NO route from block 516 to block 510 where the eye tracking system 118 is used, as needed, during execution of the application(s) (e.g., a video game). In that case (i.e., following the NO route from block 516), the process 500 may return to block 516 following a subsequent performance of the operation(s) at block 514 to iterate the determination at block 516. If and when the determination at block 516 is to calibrate the eye tracking system 118, the process 500 may follow the YES route from block 516 to block 518.

At 518, the processor(s) may recalibrate the eye tracking system 118. For example, the process 300 of FIG. 3 may be performed at block 518. Additionally, or alternatively, the process 400 of FIG. 4 may be performed at block 518. That is, the eye tracking system 118 may be calibrated based at least in part on a user interface element 120, as described herein. Following the recalibration of the eye tracking system 118 at block 518, the process 500 may return to block 510 where the eye tracking system 118 is used, as needed, during execution of the application(s) (e.g., a video game). Accordingly, the process 500 may iteratively recalibrate at various times throughout a session involving the user 108 wearing the HMD 102, such as at times when suitable user interface elements 120 are presented at various locations on the display panel(s) 114 of the HMD 102 throughout the session.

Figure 6:
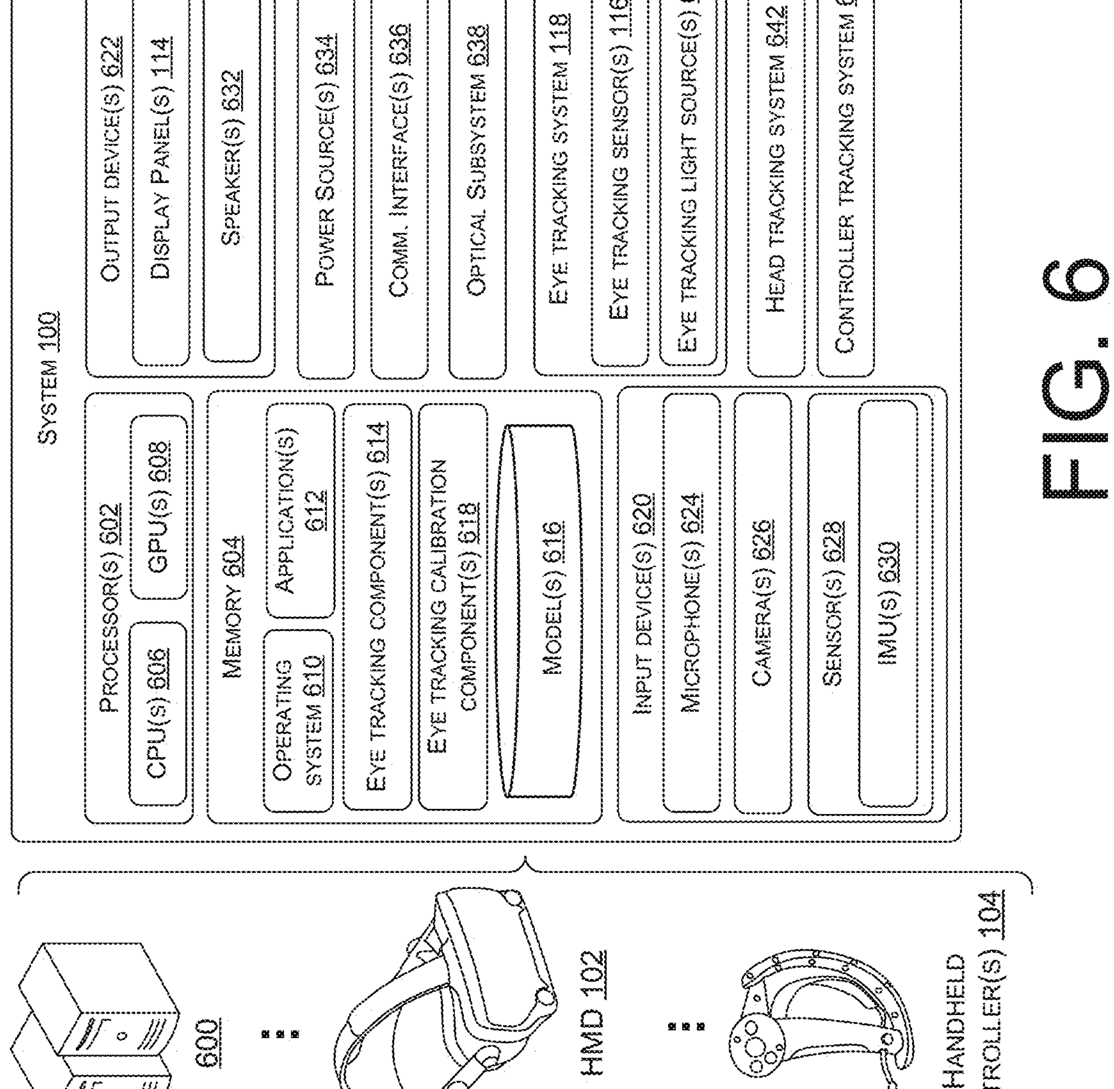
FIG. 6 illustrates example components of a system in which the techniques disclosed herein can be implemented, in accordance with embodiments disclosed herein.

FIG. 6 illustrates example components of a system 100 in which the techniques disclosed herein can be implemented, in accordance with embodiments disclosed herein. As mentioned above, the system 100 can be a distributed system including the HMD 102, the handheld controller(s) 104 and one or more additional computers 600 that is/are communicatively coupled to the HMD 102. In FIG. 6, the additional computer(s) 600 may represent the host computer 106 and/or the remote system 110 of FIG. 1. Alternatively, the system 100 can include a standalone HMD 102, and/or a standalone HMD 102 and one or more handheld controllers 104.

The HMD 102 may be implemented as a device that is to be worn by a user 108 (e.g., on a head of the user 108). In some embodiments, the HMD 102 may be head-mountable, such as by allowing a user 108 to secure the HMD 102 on his/her head using a securing mechanism (e.g., an adjustable band) that is sized to fit around a head of a user 108. In some embodiments, the HMD 102 comprises a VR, AR, or MR headset that includes a near-eye or near-to-eye display(s). As such, the terms "wearable device", "wearable electronic device", "VR headset", "AR headset", "MR headset," and "head-mounted display (HMD)" may be used interchangeably herein to refer to the device 102. However, it is to be appreciated that these types of devices are merely example of a HMD 102, and it is to be appreciated that the HMD 102 may be implemented in a variety of other form factors.

In the illustrated implementation, the system 100 includes the one or more processors 602 and the memory 604 (e.g., computer-readable media 604). In some implementations, the processors(s) 602 may include a CPU(s) 606, a GPU(s) 608, both a CPU(s) 606 and a GPU(s) 608, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 602 may possess its own local memory, which also may store program modules, program data, and/or one or more operating systems.

The memory 604 may include volatile and nonvolatile memory, removable and non-removable media implemented in any method or technology for storage of information, such as computer-readable instructions, data structures, program modules, or other data. Such memory includes, but is not limited to, random access memory (RAM), read-only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, redundant array of independent disks (RAID) storage systems, or any other medium which can be used to store the desired information and which can be accessed by a computing device. The memory 604 may be implemented as computer-readable storage media ("CRSM"), which may be any available physical media accessible by the processor(s) 602 to execute instructions stored on the memory 604. In one basic implementation, CRSM may include RAM and Flash memory. In other implementations, CRSM may include, but is not limited to, ROM, EEPROM, or any other non-transitory and/or tangible medium which can be used to store the desired information and which can be accessed by the processor(s) 602.

In general, the system 100 may include logic (e.g., software, hardware, and/or firmware, etc.) that is configured to implement the techniques, functionality, and/or operations described herein. The computer-readable media 604 is shown as including various modules, such as instruction, datastores, and so forth, which may be configured to execute on the processor(s) 602 for carrying out the techniques, functionality, and/or operations described herein. A few example functional modules are shown as stored in the computer-readable media 604 and executable on the processor(s) 602, although the same functionality may alternatively be implemented in hardware, firmware, or as a system on a chip (SOC), and/or other logic.

An operating system module 610 may be configured to manage hardware within and coupled to the system 100 for the benefit of other modules. In addition, in some instances the system 100 may include one or more applications 612 stored in the memory 604 or otherwise accessible to the system 100. In some examples, the application(s) 612 includes a gaming application (e.g., a video game, such as a VR video game). However, the system 100 may include any number or type of applications and is not limited to the specific example shown here. An eye tracking component(s) 614 may be configured to perform an eye tracking algorithm (e.g., a VOG-based eye tracking algorithm) for the eye tracking system 118. The specific eye tracking algorithm performed by the eye tracking component(s) 614 can vary depending on the implementation. In some examples, the eye tracking component(s) 614 is configured to analyze eye data 122 generated by the eye tracking sensor(s) 116 (e.g., image data representing one or more images of the eye(s) 124, such as one or more images captured by a camera(s)) to generate eye tracking data indicative of where the user 108 is looking. In some examples, the eye tracking component(s) 614 utilize a model(s) 616, such as a trained machine learning model(s), to determine where the user 108 is looking based on the eye data 122 generated by the eye tracking sensor(s) 116. An eye tracking calibration component(s) 618 may be configured to perform the techniques described herein to calibrate the eye tracking system 118. For example, the eye tracking calibration component(s) 618 may be configured to perform the process 300, the process 400, and/or the process 500, as described above.

Generally, the system 100 has input devices 620 and output devices 622. The input devices 620 may include the handheld controller(s) 104, in some examples. In some implementations, one or more microphones 624 may function as input devices 620 to receive audio input, such as user voice input. In some implementations, one or more cameras 626 or other types of sensors 628, such as an inertial measurement unit (IMU) 630, or the like, may function as input devices 620. For example, the IMU 630 may be configured to detect head motion of the user 108, including for gestural input purposes. The sensors 628 may further include sensors used to generate motion, position, and orientation data, such as gyroscopes, accelerometers, magnetometers, color sensors, or other motion, position, and orientation sensors. The sensors 628 may also include sub-portions of sensors, such as a series of active or passive markers that may be viewed externally by a camera or color sensor in order to generate motion, position, and orientation data. For example, a VR headset may include, on its exterior, multiple markers, such as reflectors or lights (e.g., infrared or visible light) that, when viewed by an external camera or illuminated by a light (e.g., infrared or visible light), may provide one or more points of reference for interpretation by software in order to generate motion, position, and orientation data. The sensors 628 may include light sensors that are sensitive to light (e.g., infrared or visible light) that is projected or broadcast by base stations in the environment of the HMD 102. IMU 630 may be an electronic device that generates calibration data based on measurement signals received from accelerometers, gyroscopes, magnetometers, and/or other sensors suitable for detecting motion, correcting error associated with IMU 630, or some combination thereof. Based on the measurement signals such motion-based sensors, such as the IMU 630, may generate calibration data indicating an estimated position of HMD 102 relative to an initial position of HMD 102. For example, multiple accelerometers may measure translational motion (forward/back, up/down, left/right) and multiple gyroscopes may measure rotational motion (e.g., pitch, yaw, and roll). IM 630 can, for example, rapidly sample the measurement signals and calculate the estimated position of HMD 102 from the sampled data. For example, IM 630 may integrate measurement signals received from the accelerometers over time to estimate a velocity vector and integrates the velocity vector over time to determine an estimated position of a reference point on HMD 102. The reference point is a point that may be used to describe the position of the HMD 102. While the reference point may generally be defined as a point in space, in various embodiments, reference point is defined as a point within HMD 102 (e.g., a center of the IMU 630). Alternatively, IMU 630 provides the sampled measurement signals to an external console (or other computing device), which determines the calibration data.

The sensors 628 may operate at relatively high frequencies in order to provide sensor data at a high rate. For example, sensor data may be generated at a rate of 1000 Hz (or 1 sensor reading every 1 millisecond). In this way, one thousand readings are taken per second. When sensors generate this much data at this rate (or at a greater rate), the data set used for predicting motion is quite large, even over relatively short time periods on the order of the tens of milliseconds. As mentioned, in some embodiments, the sensors 628 may include light sensors that are sensitive to light emitted by base stations in the environment of the HMD 102 for purposes of tracking position and/or orientation, pose, etc., of the HMD 102 in 3D space. The calculation of position and/or orientation may be based on timing characteristics of light pulses and the presence or absence of light detected by the sensors 628.

In some embodiments, additional input devices 620 may be provided in the form of a keyboard, keypad, mouse, touch screen, joystick, and the like. In some examples, the HMD 102 may omit a keyboard, keypad, or other similar forms of mechanical input. In some examples, the HMD 102 may include control mechanisms, such as basic volume control button(s) for increasing/decreasing volume, as well as power and reset buttons.

The output devices 622 may include a display(s) or display panels 114, (e.g., a stereo pair of display panels). The display panel(s) 114 of the HMD 102 may utilize any suitable type of display technology, such as an emissive display that utilizes light emitting elements (e.g., light emitting diodes (LEDs)) to emit light during presentation of frames on the display panel(s) 114. As an example, display panel(s) 114 of the HMD 102 may comprise liquid crystal displays (LCDs), organic light emitting diode (OLED) displays, inorganic light emitting diode (ILED) displays, or any other suitable type of display technology for HMD applications. The output devices 622 may further include, without limitation, a light element (e.g., LED), a vibrator to create haptic sensations, as well as one or more speakers 632 (e.g., an off-ear speaker(s)).

The system 100 may include a power source(s) 634, such as one or more batteries. For example, the HMD 102 may be powered by one or more batteries, and/or the handheld controller(s) 104 may be powered by one or more batteries. Additionally, or alternatively, the HMD 102 and/or the handheld controller(s) 104 may include a power cable port to connect to an external power source via wired means, such as a cable.

The system 100 (e.g., the HMD 102 and/or the handheld controller(s) 104) may further include a communications interface(s) 636, such as a wireless unit coupled to an antenna(s) to facilitate a wireless connection to a network. Such a wireless unit may implement one or more of various wireless technologies, such as Wi-Fi, Bluetooth, radio frequency (RF), and so on. It is to be appreciated that the HMD 102 and/or the handheld controller(s) 104 may further include physical ports to facilitate a wired connection to a network, a connected peripheral device (including the compute(s) 600, such as the host computer 106, which may be a PC, a game console, etc.), or a plug-in network device that communicates with other wireless networks.

The HMD 102 may further include optical subsystem 638 that directs light from the electronic display panel(s) 114 to a user's eye(s) 124 using one or more optical elements. The optical subsystem 638 may include various types and combinations of different optical elements, including, without limitations, such as apertures, lenses (e.g., Fresnel lenses, convex lenses, concave lenses, etc.), filters, and so forth. In some embodiments, one or more optical elements in optical subsystem 638 may have one or more coatings, such as anti-reflective coatings. Magnification of the image light by optical subsystem 638 allows electronic display panel(s) 114 to be physically smaller, weigh less, and consume less power than larger displays. Additionally, magnification of the image light may increase a field of view (FOV) of the displayed content (e.g., images). For example, the FOV of the displayed content is such that the displayed content is presented using almost all (e.g., 120-150 degrees diagonal), and in some cases all, of the user's FOV. AR applications may have a narrower FOV (e.g., about 40 degrees FOV). Optical subsystem 616 may be designed to correct one or more optical errors, such as, without limitation, barrel distortion, pincushion distortion, longitudinal chromatic aberration, transverse chromatic aberration, spherical aberration, comatic aberration, field curvature, astigmatism, and so forth. In some embodiments, content provided to electronic display panel(s) 114 for display is pre-distorted, and optical subsystem 638 corrects the distortion when it receives image light from electronic display panel(s) 114 generated based on the content.

The HMD system 100 may further include the aforementioned eye tracking system 118 that generates eye tracking data. The eye tracking system 118 may include, without limitation, an eye tracking sensor(s) 116, such as a camera(s) or other optical sensor(s) inside HMD 104 to capture image data (or information) of a user's eye(s) 124, and the eye tracking system 118 may use the captured data/information (e.g., by executing the eye tracking component(s) 614) to identify the pupil(s) of the eye(s) 124 and/or other landmarks to determine eye orientation, 3D position of the eye(s) 124, interpupillary distance, interocular distance, motion vectors, including a magnitude of torsion and rotation (i.e., roll, pitch, and yaw), and/or gaze directions for each eye 124. In one example, light, such as infrared light, is emitted from a light source(s) 640 within HMD 104 and reflected from each eye 124. The reflected light is received or detected by the eye tracking sensor(s) 116 (e.g., a camera) of the eye tracking system 118 and analyzed to extract eye rotation from changes in the infrared light reflected by each eye. Many methods for tracking the eyes 124 of a user 108 can be used by eye tracking system 118. Accordingly, eye tracking system 118 may track up to six degrees of freedom of each eye 124 (i.e., 3D position, roll, pitch, and yaw) and at least a subset of the tracked quantities may be combined from two eyes 124 of a user 108 to estimate a gaze point 130 (i.e., a 2D location or position (or 3D location or position in the virtual scene) where the user 108 is looking), which may map to a location(s) 128 on the display panel(s) 114 for predicting where the user 108 will be looking in terms of an individual subset (e.g., a row) or a group of contiguous subsets (e.g., a group of contiguous rows) of the pixels of the display panel(s) 114. For example, eye tracking system 118 may integrate information from past measurements, measurements identifying a position of a user's 108 head, and 3D information describing a scene presented by display panel(s) 114. Thus, information for the position and orientation of the user's 108 eyes is used to determine the gaze point in a virtual scene presented by HMD 102 where the user 108 is looking, and to map that gaze point to a location(s) on the display panel(s) 114 of the HMD 102.

The system 100 may further include a head tracking system 642. The head tracking system 642 may leverage one or more of the sensor 628 to track head motion, including head rotation, of the user 108. For example, the head tracking system 642 can track up to six degrees of freedom of the HMD 102 (i.e., 3D position, roll, pitch, and yaw). These calculations can be made at every frame of a series of frames so that the application 612 can determine how to render a scene in the next frame in accordance with the head position and orientation. In some embodiments, the head tracking system 642 is configured to generate head tracking data that is usable to predict a future pose (position and/or orientation) of the HMD 102 based on current and/or past data, and/or based on the known/implied scan out latency of the individual subsets of pixels in a display system. This is because the application 612 is asked to render a frame before the user 108 actually sees the light (and, hence, the image) on the display panel(s) 114. Accordingly, a next frame can be rendered based on this future prediction of head position and/or orientation that was made at an earlier point in time. Rotation data provided by the head tracking system 642 can be used to determine both direction of HMD 102 rotation, and amount of HMD 102 rotation in any suitable unit of measurement. For example, rotational direction may be simplified and output in terms of positive or negative horizontal and positive or negative vertical directions, which correspond to left, right, up, and down. Amount of rotation may be in terms of degrees, radians, etc. Angular velocity may be calculated to determine a rate of rotation of the HMD 102.

The system 100 may further include a controller tracking system 644. The controller tracking system 644 may leverage one or more of the sensors 628 to track controller motion. For example, the controller tracking system 644 can track up to six degrees of freedom of the controllers 104 the user 108 holds in his/her hands (i.e., 3D position, roll, pitch, and yaw). These calculations can be made at every frame of a series of frames so that an application 612 (e.g., a video game) can determine how to render virtual controllers and/or virtual hands in a scene in the next frame in accordance with the controller position(s) and orientation(s). In some embodiments, the controller tracking system 644 is configured to predict a future position and/or orientation of the controller(s) 104 based on current and/or past data, as described above with respect to the head tracking system 642.

The foregoing may also be understood in view of the following clauses:

1. A system comprising:

a head-mounted display (HMD) comprising:

a display panel; and an eye tracking sensor;

an eye tracking system;

a processor; and memory storing computer-executable instructions that, when executed by the processor, cause the processor to:

present, during gameplay of a video game on the HMD, a user interface element on the display panel;

receive, from the eye tracking sensor, and in response to presenting the user interface element, eye data associated with one or more eyes of the user; and calibrate the eye tracking system based at least in part on the eye data and location data indicating a location on the display panel where the user interface element is presented.

2. The system of clause 1, wherein the user interface element is a word of a message for the user to read.

3. The system of clause 1, the computer-executable instructions, when executed by the processor, further cause the processor to output, via a speaker of the HMD, at a time of the presenting of the user interface element, a sound associated with the user interface element.

4. The system of clause 1, wherein the computer-executable instructions, when executed by the processor, further cause the processor to, after calibrating the eye tracking system:

execute an application that uses the eye tracking system;

present, during the gameplay of the video game on the HMD, a second user interface element on the display panel;

receive, from the eye tracking sensor, and in response to presenting the second user interface element, second eye data associated with the one or more eyes of the user; and recalibrate the eye tracking system based at least in part on the second eye data and second location data indicating a second location on the display panel where the second user interface element is presented.

5. The system of clause 1, wherein:

the eye tracking sensor comprises a camera; and the eye data comprises image data of the one or more eyes of the user.

6. The system of clause 1, wherein the computer-executable instructions, when executed by the processor, further cause the processor to:

wait to execute an application that uses the eye tracking system until the calibrating; and start execution of the application after the calibrating.

7. A method comprising:

presenting, by a processor, during gameplay of a video game on a head-mounted display (HMD), a user interface element on a display panel of the HMD;

receiving, by the processor, from an eye tracking sensor of the HMD, and in response to the presenting of the user interface element, eye data associated with one or more eyes of the user; and calibrating, by the processor, an eye tracking system based at least in part on the eye data and location data indicating a location on the display panel where the user interface element is presented.

8. The method of clause 7, wherein the user interface element is a word of a message for the user to read.

9. The method of clause 7, further comprising outputting, by the processor, via a speaker of the HMD, at a time of the presenting of the user interface element, a sound associated with the user interface element.

10. The method of clause 7, further comprising, after the calibrating:

executing, by the processor, an application that uses the eye tracking system;

presenting, by the processor, during the gameplay of the video game on the HMD, a second user interface element on the display panel;

receiving, by the processor, from the eye tracking sensor, and in response to the presenting of the user interface element, second eye data associated with the one or more eyes of the user; and recalibrating, by the processor, the eye tracking system based at least in part on the second eye data and second location data indicating a second location on the display panel where the second user interface element is presented.

11. The method of clause 7, further comprising:

waiting, by the processor, to execute an application that uses the eye tracking system until the calibrating; and starting, by the processor, execution of the application after the calibrating.

12. The method of clause 7, wherein:

the eye tracking sensor comprises a camera; and the eye data comprises image data of the one or more eyes of the user.

13. One or more non-transitory computer-readable media storing computer-executable instructions that, when executed by a processor, cause performance of operations comprising:

presenting, during gameplay of a video game on a head-mounted display (THMID), a user interface element on a display panel of the HMD;

receiving, from an eye tracking sensor of the HMD, and in response to the presenting of the user interface element, eye data associated with one or more eyes of the user; and calibrating an eye tracking system based at least in part on the eye data and location data indicating a location on the display panel where the user interface element is presented.

14. The one or more non-transitory computer-readable media of clause 13, wherein the user interface element is a word of a message for the user to read.

15. The one or more non-transitory computer-readable media of clause 13, the operations further comprising outputting, via a speaker of the HMD, at a time of the presenting of the user interface element, a sound associated with the user interface element.

16. The one or more non-transitory computer-readable media of clause 13, wherein:

the eye tracking sensor comprises a camera; and the eye data comprises image data of the one or more eyes of the user.

17. The one or more non-transitory computer-readable media of clause 13, the operations further comprising:

waiting to execute an application that uses the eye tracking system until the calibrating; and starting execution of the application after the calibrating.

18. The one or more non-transitory computer-readable media of clause 13, the operations further comprising, after the calibrating:

executing an application that uses the eye tracking system;

presenting, during the gameplay of the video game on the HMID, a second user interface element on the display panel;

receiving, from the eye tracking sensor, and in response to the presenting of the second user interface element, second eye data associated with the one or more eyes of the user; and recalibrating the eye tracking system based at least in part on the second eye data and second location data indicating a second location on the display panel where the second user interface element is presented.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
a head-mounted display (HMD) comprising:
a display panel; and
an eye tracking sensor;
an eye tracking system;
a handheld controller;
a processor; and
memory storing computer-executable instructions that, when executed by the processor, cause the processor to:
present a user interface element on the display panel;
receive, from the handheld controller, first user input data indicating that a user wearing the HMD has provided first user input via the handheld controller to move a pointer over the user interface element;
highlight, in response to receiving the first user input data from the handheld controller, the user interface element on the display panel, wherein highlighting the user interface element comprises at least one of:
changing a color of the user interface element;
increasing an intensity of the color;
changing text of the user interface element to bold font; or
underlining the text;
receive, from the handheld controller, after highlighting the user interface element, second user input data indicating that the user has provided second user input via the handheld controller to select the user interface element;
receive, from the eye tracking sensor, in response to receiving the first user input data from the handheld controller, in response to highlighting the user interface element, and in response to receiving the second user input data from the handheld controller, eye data associated with one or more eyes of the user; and
calibrate the eye tracking system based at least in part on the eye data and location data indicating a location on the display panel where the user interface element is presented, wherein calibrating the eye tracking system is performed as a smooth adjustment using a sliding window average or a weighted adjustment to gradually adjust the eye tracking system from a current state to a calibrated state.

2. The system of claim 1, wherein the user interface element is presented during gameplay of a video game on the HMD.

3. The system of claim 1, wherein the computer-executable instructions, when executed by the processor, further cause the processor to, after calibrating the eye tracking system:
execute an application that uses the eye tracking system;
present a second user interface element on the display panel;
receive, from the handheld controller, third user input data indicating that the user has provided third user input associated with the second user interface element via the handheld controller;
receive, from the eye tracking sensor, and in response to receiving the third user input from the handheld controller, second eye data associated with the one or more eyes of the user; and
recalibrate the eye tracking system based at least in part on the second eye data and second location data indicating a second location on the display panel where the second user interface element is presented.

4. The system of claim 1, wherein:
the eye tracking sensor comprises a camera; and
the eye data comprises image data of the one or more eyes of the user.

5. The system of claim 1, wherein the computer-executable instructions, when executed by the processor, further cause the processor to, after calibrating the eye tracking system:
execute a virtual reality application that uses the eye tracking system;
determine, based at least in part on eye tracking data generated by the eye tracking system, a gaze point associated with the user; and
use the gaze point for wireless foveated transport of pixel data generated by the virtual reality application to the HMD.

6. The system of claim 1, wherein highlighting the user interface element comprises the increasing of the intensity of the color.

7. The system of claim 1, wherein:
the location data is used as a source of truth for where the one or more eyes of the user are directed at a time at which the eye data is generated by the eye tracking sensor; and
calibrating the eye tracking system comprises adjusting a mapping from the eye data to a gaze angle corresponding to the location on the display panel where the user interface element is presented.

8. A method comprising:
presenting, by a processor, a user interface element on a display panel of a head-mounted display (HMD);
receiving, by the processor, from a handheld controller, first user input data indicating that a user wearing the HMD has provided first user input via the handheld controller to move a pointer over the user interface element;
highlighting, by the processor, in response to the receiving of the first user input data from the handheld controller, the user interface element on the display panel, wherein the highlighting of the user interface element comprises at least one of:
changing a color of the user interface element;
increasing an intensity of the color;
changing text of the user interface element to bold font; or
underlining the text;
receiving, by the processor, from the handheld controller, after the highlighting of the user interface element, second user input data indicating that the user has provided second user input via the handheld controller to select the user interface element;
receiving, by the processor, from an eye tracking sensor of the HMD, in response to the receiving of the first user input data from the handheld controller, in response to the highlighting of the user interface element, and in response to the receiving of the second user input data from the handheld controller, eye data associated with one or more eyes of the user; and
calibrating, by the processor, an eye tracking system based at least in part on the eye data and location data indicating a location on the display panel where the user interface element is presented, wherein the calibrating is performed as a smooth adjustment using a sliding window average or a weighted adjustment to gradually adjust the eye tracking system from a current state to a calibrated state.

9. The method of claim 8, wherein the user interface element is presented during gameplay of a video game on the HMD.

10. The method of claim 8, further comprising, after the calibrating:

executing, by the processor, an application that uses the eye tracking system;

presenting, by the processor, a second user interface element on the display panel;

receiving, by the processor, from the handheld controller, third user input data indicating that the user has provided third user input associated with the second user interface element via the handheld controller;

receiving, by the processor, from the eye tracking sensor, and in response to the receiving of the third user input data from the handheld controller, second eye data associated with the one or more eyes of the user; and recalibrating, by the processor, the eye tracking system based at least in part on the second eye data and second location data indicating a second location on the display panel where the second user interface element is presented.

11. The method of claim 8, further comprising:

waiting, by the processor, to execute an application that uses the eye tracking system until the calibrating; and starting, by the processor, execution of the application after the calibrating.

12. The method of claim 8, further comprising, after the calibrating:

executing, by the processor, a virtual reality application that uses the eye tracking system;

determining, by the processor, based at least in part on eye tracking data generated by the eye tracking system, a gaze point associated with the user; and using, by the processor, the gaze point for wireless foveated transport of pixel data generated by the virtual reality application to the HMD.

13. The method of claim 8, wherein the highlighting of the user interface element comprises the changing of the text of the user interface element to the bold font.

14. The method of claim 8, wherein the user interface element is an icon.

15. One or more non-transitory computer-readable media storing computer-executable instructions that, when executed by a processor, cause performance of operations comprising:

presenting a user interface element on a display panel of a head-mounted display (HMD);

receiving, from a handheld controller, first user input data indicating that a user wearing the HMD has provided first user input via the handheld controller to move a pointer over the user interface element;

highlighting, in response to the receiving of the first user input data from the handheld controller, the user interface element on the display panel, wherein the highlighting of the user interface element comprises at least one of:

changing a color of the user interface element;

increasing an intensity of the color;

changing text of the user interface element to bold font; or underlining the text;

receiving, from the handheld controller, after the highlighting of the user interface element, second user input data indicating that the user has provided second user input via the handheld controller to select the user interface element;

receiving, from an eye tracking sensor of the HMD, in response to the receiving of the first user input data from the handheld controller, in response to the highlighting of the user interface element, and in response to the receiving of the second user input data from the handheld controller, eye data associated with one or more eyes of the user; and calibrating an eye tracking system based at least in part on the eye data and location data indicating a location on the display panel where the user interface element is presented, wherein the calibrating is performed as a smooth adjustment using a sliding window average or a weighted adjustment to gradually adjust the eye tracking system from a current state to a calibrated state.

16. The one or more non-transitory computer-readable media of claim 15, wherein the user interface element is presented during gameplay of a video game on the HMD.

17. The one or more non-transitory computer-readable media of claim 15, the operations further comprising:

waiting to execute an application that uses the eye tracking system until the calibrating; and starting execution of the application after the calibrating.

18. The one or more non-transitory computer-readable media of claim 15, the operations further comprising, after the calibrating:

executing an application that uses the eye tracking system;

presenting a second user interface element on the display panel;

receiving, from the handheld controller, third user input data indicating that the user has provided third user input associated with the second user interface element via the handheld controller;

receiving, from the eye tracking sensor, and in response to the receiving of the third user input data from the handheld controller, second eye data associated with the one or more eyes of the user; and recalibrating the eye tracking system based at least in part on the second eye data and second location data indicating a second location on the display panel where the second user interface element is presented.

19. The one or more non-transitory computer-readable media of claim 15, the operations further comprising, after the calibrating:

executing a virtual reality application that uses the eye tracking system;

determining, based at least in part on eye tracking data generated by the eye tracking system, a gaze point associated with the user; and using the gaze point for wireless foveated transport of pixel data generated by the virtual reality application to the HMD.

20. The one or more non-transitory computer-readable media of claim 15, wherein the highlighting of the user interface element comprises the changing of the color of the user interface element.

* * * * *